United States Patent
Zhang et al.

(10) Patent No.: US 10,414,868 B2
(45) Date of Patent: Sep. 17, 2019

(54) PREPARATION METHOD OF POLYIMIDE

(71) Applicants: Changchun Hipolyking Co., LTD, ChangChun (CN); Mengxian Ding, Changchun (CN)

(72) Inventors: Xin Zhang, Jilin (CN); Jibin Zhong, Jilin (CN); Mengxian Ding, ChangChun (CN); Xiaoyi Lv, Jilin (CN)

(73) Assignee: CHANGCHUN HIPOLYKING CO., LTD., Changchun (CN)

( * ) Notice: Subject to any disclaimer, the term of this patent is extended or adjusted under 35 U.S.C. 154(b) by 55 days.

(21) Appl. No.: 14/381,219

(22) PCT Filed: Nov. 8, 2012

(86) PCT No.: PCT/CN2012/084293
§ 371 (c)(1),
(2) Date: Aug. 27, 2014

(87) PCT Pub. No.: WO2013/143288
PCT Pub. Date: Oct. 3, 2013

(65) Prior Publication Data
US 2015/0126704 A1    May 7, 2015

(30) Foreign Application Priority Data

Mar. 26, 2012  (CN) .......................... 2012 1 0082313

(51) Int. Cl.
*C08G 73/10* (2006.01)
*C08L 79/08* (2006.01)

(52) U.S. Cl.
CPC ....... *C08G 73/1032* (2013.01); *C08G 73/105* (2013.01); *C08G 73/1014* (2013.01); *C08G 73/1046* (2013.01); *C08G 73/1053* (2013.01); *C08G 73/1067* (2013.01); *C08G 73/1071* (2013.01); *C08L 79/08* (2013.01)

(58) Field of Classification Search
USPC ........................................................ 549/241
See application file for complete search history.

(56) References Cited

U.S. PATENT DOCUMENTS

| 3,179,631 | A | * | 4/1965 | Laszlo | ................ | C08G 73/1003 51/298 |
|---|---|---|---|---|---|---|
| 4,759,987 | A | | 7/1988 | Mizobe et al. | | |
| 4,783,522 | A | | 11/1988 | Aritomi et al. | | |
| 4,954,612 | A | | 9/1990 | Nomura et al. | | |
| 5,336,788 | A | * | 8/1994 | Lesins | ................. | C07D 307/89 549/241 |
| 2003/0181626 | A1 | | 9/2003 | Lindway | | |
| 2006/0135791 | A1 | * | 6/2006 | Pressman | ............. | C07C 51/087 549/281 |
| 2006/0270825 | A1 | | 11/2006 | Angermeier et al. | | |

FOREIGN PATENT DOCUMENTS

| CN | 1397583 | A | 2/2003 |
|---|---|---|---|
| CN | 1597735 | A | 3/2005 |
| CN | 1656148 | A | 8/2005 |
| CN | 101117384 | A | 2/2008 |
| CN | 101392057 | A | 3/2009 |
| CN | 102604093 | A | 7/2012 |
| EP | 0274602 | A1 | 7/1988 |
| EP | 0330739 | A2 | 9/1989 |
| JP | S61281150 | A | 12/1986 |
| JP | 03-221524 | A | 9/1991 |
| JP | 2005520899 | A | 7/2005 |
| KR | 100552133 | B1 | 2/2006 |
| WO | 03080709 | A1 | 10/2003 |

(Continued)

OTHER PUBLICATIONS

Wang et al (Nanocomposites Derived from a Low-Color Aromatic Polyimide (CP2) and Amine-Functionalized Vapor-Grown Carbon Nanofibers: In Situ Polymerization and Characterization, Macromolecules, 2007, 40 (17), pp. 6100-6111). (Year: 2007).*
The first Office Action dated Sep. 8, 2015 regarding a Japanese counterpart application.
The European Search Report dated Aug. 3, 2015 regarding a European counterpart application (EP 12872358).
International Search Report for PCT/CN2012/084293.
Buu Dao et al., "Important factors controlling synthesis of imides in water", High Perform. Polym. 11 (1999) 205-218; Printed in the UK.
John Chiefari et al., "Water as Solvent in Polyimide Synthesis: Thermoset and Thermoplastic Examples", CSIRO Molecular Science, Clayton, Melbourne VIC, 3169 Australia, 11 pages.

(Continued)

*Primary Examiner* — Rachel Kahn
(74) *Attorney, Agent, or Firm* — Kilpatrick Townsend & Stockton LLP

(57) ABSTRACT

The present invention provides a preparation method of polyimide, comprising the following steps: a) carrying out a dehydration polymerization reaction on a diamine and an anhydride of an organic acid in a non-polar solvent to obtain a mixture, the non-polar solvent being one or more of arene, aliphatic hydrocarbon, halogenated arene and halogenated aliphatic hydrocarbon, and the anhydride of the organic acid being one or more of dianhydride and single anhydride: and b) filtering the mixture obtained in step a) and drying to obtain the polyimide. In the present invention, the dehydration polymerization reaction between the diamine and the anhydride of the organic acid can be carried out directly in the non-polar solvent to obtain the polyimide which cannot be dissolved in the non-polar solvent. Therefore, polyimide powder with fine particles can be obtained by directly filtering and drying the reaction mixture without washing. Not only complex washing and grinding processes are not needed, but also the production period is shortened, the production cost is reduced, and the large-scale production becomes more convenient.

1 Claim, No Drawings

(56) References Cited

FOREIGN PATENT DOCUMENTS

WO    2008063206 A1    5/2008

OTHER PUBLICATIONS

John Chiefari et al., "Water as Solvent in Polyimide Synthesis II: Processable Aromatic Polyimides", CSIRO Molecular Science, Clayton, Melbourne VIC, 3169 Australia, 14 pages.
Francois Basset et al., "Crystalline Polyimide Particles Generated via Thermal Imidization in a Heterogeneous Medium", Polymers for Advanced Technologies vol. 9, pp. 202-209.

* cited by examiner

PREPARATION METHOD OF POLYIMIDE

The application claims priority of Chinese Patent Application No. 201210082313.7, filed with the State Intellectual Property Office of the P.R.C on Mar. 26, 2012, entitled "Preparation Method of Polyimide", the whole content of which is incorporated herein by reference.

TECHNICAL FIELD

The invention belongs to the technical field of polyimide, and especially relates to a preparation method of polyimide.

BACKGROUND

Polyimide is one of organic polymer materials with the excellent comprehensive performance, and has the advantages of high-temperature resistance up to 400° C. above, long-term application ranging from −200° C. to 300° C., high insulation performance and the like, which is used widely in aerospace, aviation, microelectronics, nanotechnology, liquid crystals, separating membranes, laser and other fields.

In the prior art, polyimide is generally synthesized using dianhydride and diamine as raw materials, firstly by performing low-temperature polycondensation on dianhydride and diamine in an aprotic polar solvent such as N,N-dimethyl acetamide, N,N-dimethyl formamide, N-methyl pyrrolidone, to obtain soluble polyamic acid; using the polyamic acid solution to form a film or spinning the polyamic acid solution, followed by heating to about 300° C. to obtain a polyimide film or polyimide fibers by cyclodehydration; or adding acetic anhydride and a tertiary amine catalyst to the polyamic acid solution to obtain a polyimide solution or a polyimide powder by cyclodehydration. For example, U.S. Pat. No. 3,179,631 and Polym. Adv. Tech, 1998, 9: 202 both disclose a method of polymerizing a dianhydride with a diamine in N,N-dimethyl acetamide, N,N-dimethyl formamide or N-methyl pyrrolidone to obtain a polyamic acid solution, followed by adding a dehydrating agent acetic anhydride and a tertiary amine catalyst to obtain polyimide by cyclization; U.S. Pat. No. 3,249,588 and Polym. Adv. Tech, 1998,9: 202 also discloses a method of polymerizing a dianhydride with a diamine in N,N-dimethyl acetamide, N,N-dimethyl formamide or N-methyl pyrrolidone to obtain a polyamic acid solution, followed by directly heating the polyamic acid solution or adding triethylamine with heating to obtain polyimide by cyclization; in addition, U.S. Pat. No. 5,378,420 and Polym. Adv. Tech, 1993, 9: 202 also discloses a method of synthesizing polyimide directly from a tetracarboxylic acid or a dianhydride and a diamine at a high temperature with phenols as a solvent. However, when the polyimide powder is prepared using the above methods, complicated post-treatments such as multiple washing etc. are needed to obtain a polyimide powder with high purity; when the resulting polyimide is soluble in a solvent, it is necessary to carry out solvent removal, grinding and other steps to obtain the polyimide powder, which is not only cumbersome and costly, but also toxic because of the solvent involved, which is not favorable for the polyimide production. High Perf. Polym., 1999,11: 205; High Perf. Polym., 2003,15: 269; High Perf. Polym., 2006, 18: 31 and others also discloses a polyimide synthesis using water as a medium, but this method need to be performed under pressure, and the molecular weight of the resulting polyimide is lower.

SUMMARY

In view of the above, a technical problem to be solved by the present invention is to provide a preparation method of polyimide. The present invention provides a method for preparing a polyimide powder, which uses a low-cost reaction medium, without complicated post-treatments, and the preparation process is simple and the cost is lower.

The present invention provides a preparation method of polyimide, comprising the following steps:

a) carrying out a dehydration polymerization reaction on a diamine and an anhydride of an organic acid in a non-polar solvent to obtain a mixture, the non-polar solvent being one or more of aromatic hydrocarbon, aliphatic hydrocarbon, halogenated aromatic hydrocarbon and halogenated aliphatic hydrocarbon, and the anhydride of the organic acid being one or more of dianhydride and monoanhydride;

b) filtering the mixture obtained in the step followed by drying to obtain the polyimide.

Preferably, in the step a), the diamine is one or more of p-phenylenediamine, m-phenylenediamine, diphenyl ether diamine, diphenylmethane diamine, hydroquinone diether diamine and bisphenol A diether diamine.

Preferably, in the step a), the dianhydride is one or more of pyromellitic dianhydride, benzophenonetetracarboxylic dianhydride, biphthalic dianhydride, triphenyl diether dianhydride, tetracarboxydiphthalic ether dianhydride, diphenylthioether dianhydride, hydroquinone diether dianhydride, resorcinol diether dianhydride and bisphenol A diether dianhydride, and said monoanhydride is one or more of phthalic anhydride, 4-phenylalkynyl phthalic anhydride, norbornene dicarboxylic anhydride and maleic anhydride.

Preferably, in the step a), the non-polar solvent is one or more of xylene, halogenated xylene, halogenated benzene and a fuel oil with a boiling point above 150° C.

Preferably, the step a) includes:

carrying out the dehydration polymerization reaction on the diamine, the anhydride of a organic acid and a filler in the non-polar solvent to obtain the mixture.

Preferably, the filler is graphite, teflon, molybdenum disulfide, organic fibers, glass fibers or carbon fibers.

Preferably, the dianhydride is prepared according to the following method:

dissolving a tetracarboxylic acid in a solvent followed by dehydrating to obtain the dianhydride.

Preferably, the tetracarboxylic acid is one or more of pyromellitic acid, benzophenone tetracarboxylic acid, biphenyl tetracarboxylic acid, diphenyl ether tetracarboxylic acid, diphenylthioether tetracarboxylic acid, hydroquinone diether tetracarboxylic acid, triphenyl diether tetracarboxylic acid, resorcinol diether tetracarboxylic acid and bisphenol A diether tetracarboxylic acid.

Preferably, in the step a), the temperature of the dehydration polymerization reaction is above 120° C.

Preferably, in the step b), the temperature of the drying is 150° C.~300° C.

In comparison to the prior art, the present invention uses a diamine and an anhydride of an organic acid as raw materials, on which a dehydration polymerization reaction is carried out in a non-polar solvent consisting of one or more of aromatic hydrocarbon, aliphatic hydrocarbon, halogenated aromatic hydrocarbon and halogenated aliphatic hydrocarbon to obtain a mixture containing a polyimide powder, followed by filtering the mixture and drying to obtain the polyimide powder. The dehydration polymerization reaction on the diamine and the anhydride of the organic acid can take place directly in the non-polar solvent to obtain the polyimide which is insoluble in the non-polar solvent. Therefore, the polyimide powder with fine particle size can be obtained by directly filtering the reaction mixture without washing and followed by drying. Not only complex washing and grinding processes are not needed, but also the production period is shortened, the production cost is reduced, and the large-scale production becomes more convenient. Meanwhile, the invention uses a non-polar solvent as the reaction medium, which is less toxic and may be recycled by simple distillation, which further saves the preparation cost. In addition, in the present invention, a modified polyimide may be obtained by incorporating other fillers into the preparation process, thereby to satisfy different usage requirements.

DETAILED DESCRIPTION OF THE EMBODIMENTS

The present invention provides a preparation method of polyimide, comprising the following steps:

a) carrying out a dehydration polymerization reaction on a diamine and an anhydride of an organic acid in a non-polar solvent to obtain a mixture, the non-polar solvent being one or more of aromatic hydrocarbon, aliphatic hydrocarbon, halogenated aromatic hydrocarbon and halogenated aliphatic hydrocarbon, and the anhydride of the organic acid being one or more of dianhydride and monoanhydride;

b) filtering the mixture obtained in the step a) followed by drying to obtain the polyimide.

In the present invention, the dehydration polymerization reaction on the diamine and the anhydride of the organic acid can take place directly in the non-polar solvent to obtain the polyimide which is insoluble in the non-polar solvent. Therefore, the polyimide powder with fine particle size can be obtained by directly filtering the reaction mixture without washing followed by drying. Not only complex washing and grinding processes are not needed, but also the production period is shortened, the production cost is reduced, and the large-scale production becomes more convenient.

The invention uses a non-polar solvent as the reaction medium, the polyimide produced from the diamine and the anhydride of the organic acid is insoluble in the non-polar solvent, and the polyimide powder can be separated from the resulting reaction product without complicated post-treatments. In the present invention, the non-polar solvent is one or more of aromatic hydrocarbon, aliphatic hydrocarbon, halogenated aromatic hydrocarbon and halogenated aliphatic hydrocarbon, preferably a non-polar solvent with a boiling point above 120° C., more preferably one or more of xylene, halogenated xylene, halogenated benzene and a fuel oil with a boiling point above 150° C. When using a variety of non-polar solvents as the reaction medium, the proportion of each solvent is not particularly limited in the present invention and can be determined by those skilled in the art according to the cost, the boiling point of the solvent and other factors.

In the present invention, the polyimide is prepared by using a diamine and an anhydride of an organic acid as raw materials, wherein both the diamine and the anhydride of the organic acid may be well-known to those skilled in the art as the raw materials for preparing the polyimide, such as, the diamine including but not limited to one or more of p-phenylenediamine, m-phenylenediamine, diphenyl ether diamine, diphenylmethane diamine, hydroquinone diether diamine and bisphenol A diether diamine; the anhydride of the organic acid may be one or more of an dianhydride and a monohydride, wherein when adding the monohydride and the dianhydride simultaneously, the monohydride can be used to adjust the molecular weight of the resulting polyimide or to obtain an oligomer with active terminal groups. Therefore, the anhydride of the organic acid is preferably an dianhydride or a dianhydride and a monohydride, wherein, the dianhydride includes but not limited to one or more of pyromellitic dianhydride, benzophenonetetracarboxylic dianhydride, biphthalic dianhydride, triphenyl diether dianhydride, tetracarboxydiphthalic ether dianhydride, diphenylthioether dianhydride, hydroquinone diether dianhydride, resorcinol diether dianhydride and bisphenol A diether dianhydride, and the monoanhydride includes but not limited to one or more of phthalic anhydride, 4-phenylalkynyl phthalic anhydride, norbornene dicarboxylic anhydride and maleic anhydride. In the present invention, the dianhydride, also known as binary anhydride, refers to an anhydride having two anhydride structures; and the monoanhydride, also known as single anhydride, refers to an anhydride having one anhydride structure. The diamine and the dianhydride may be selected by those skilled in the art based on the performance of the final product, so as to prepare and obtain bisether anhydride-type polyimide, monoether anhydride-type polyimide, biphenyl-type polyimide, polypyromellitimide, momothioether anhydride-type polyimide and others. When a variety of anhydrides of the organic acid or the diamines are used, the proportion of each diamine or each anhydride is not particularly limited and can be determined by those skilled in the art based on the performance of the needed polyimide.

In the present invention, a commercial available dianhydride can be directly used as the raw material, and an anhydride obtained by firstly dehydrating a tetracarboxylic acid to an anhydride in a solvent also can be used as the raw material, which includes:

dissolving the tetracarboxylic acid in the solvent to carry out a dehydration reaction to obtain the dianhydride.

When using the tetracarboxylic acid as the raw material, in order to reduce reaction steps, it is preferable in the present invention to dissolve the tetracarboxylic acid in a non-polar solvent firstly and carry out the dehydration reaction to obtain the dianhydride. It is preferable in the present invention to carry out the dehydration reaction under a stirring condition, and preferable to stop the reaction when anhydride formation is above 98% followed by cooling to room temperature to obtain the dianhydride solution. There is no particular limitation to the tetracarboxylic acid in the present invention, which includs but not limited to one or more of pyromellitic acid, benzophenone tetracarboxylic acid, biphenyl tetracarboxylic acid, diphenyl ether tetracarboxylic acid, diphenylthioether tetracarboxylic acid, hydroquinone diether tetracarboxylic acid, triphenyl diether tetracarboxylic acid, resorcinol diether tetracarboxylic acid and bisphenol A diether tetracarboxylic acid.

In the present invention, the tetracarboxylic acid can also be dissolved in a polar solvent or other solvents. After obtaining the dianhydride through the dehydration reaction, the dianhydride is separated from the solvent to obtain a pure dianhydride, which reacts with the diamine continuously in the non-polar solvent.

After obtaining the dianhydride solution, the diamine is added, and the dehydration polymerization reaction is carried out continuously to obtain the polyimide. The molar ratio of the anhydride of the organic acid and the diamine is not particularly limited in the present invention, preferable 0.9~1.1:0.9~1.1. In the present invention, the temperature of the dehydration polymerization reaction on the anhydride of the organic acid and the diamine preferably is above 120° C., more preferably from 130° C. to the boiling point of the non-polar solvent used, more preferably 140° C.~160° C. It is preferable in the present invention that the reaction is performed using the anhydride of the organic acid and the diamine under reflux, and the polymerization and dehydration are carried out simultaneously to obtain a mixture of the polyimide and the non-polar solvent.

When the polymerization reaction is performed until no water is produced, the reaction is stopped to obtain a mixture of the polyimide and the non-polar solvent, the solid content of which is preferably 2%~40%, more preferably 5%~35%, most preferably 10%~30%.

After obtaining the mixture containing the polyimide, the mixture is cooled to the room temperature and filtered according to a method well-known to those skilled in the art, and the filtrate is dried to obtain a polyimide powder. In the present invention, the drying is preferably a vacuum drying, and the drying temperature is preferably 150° C.~300° C., more preferably 200° C.~290° C. After obtaining the polyimide powder, it is dissolved in a solvent and the inherent viscosity thereof is measured. The results show that the inherent viscosity of the resulting polyimide prepared by the present invention is 0.40 dL/g~1.70 dL/g.

In the present invention, most of the filtrate obtained by filtration is the non-polar solvent, which can be recycled after distilling by a method well-known to those skilled in the art, thus reducing the cost.

In order to improve the performance of the polyimide, in the present invention, it is preferable to add a filler during the polymerization reaction on the anhydride of the organic acid and the diamine, which includes the following steps:

carrying out the dehydration polymerization reaction on the diamine, the anhydride of the organic acid and the filler in a non-polar solvent to obtain a mixture.

In comparison to the polymerization reaction on the diamine and the anhydride of the organic acid alone, adding the filler at the initial stage of the polymerization reaction, i.e. adding the filler as a raw material, can achieve the modification of the polyimide. The filler is not particularly limited in the present invention, which can be selected by those skilled in the art based on the use of the polyimide product. For example, conventional reinforcing and antifriction materials can be used, such as graphite, teflon, molybdenum disulfide, organic fibers, glass fibers or carbon fibers and others, and conventional toughening materials can also be used. The amount of the filler added is not particularly limited in the present invention and can be determined by those skilled in the art based on the property of the polyimide to be modified. For example, when using graphite, carbon fibers and others, the adding amount thereof is preferably 5%~30% of the total amount of the anhydride of the organic acid and the diamine.

The present invention uses a diamine and an anhydride of an organic acid as raw materials to carry out a dehydration polymerization reaction in a non-polar solvent consisting of one or more of aromatic hydrocarbon, aliphatic hydrocarbon, halogenated aromatic hydrocarbon and halogenated aliphatic hydrocarbon to obtain a mixture containing a polyimide powder, and then filtering the mixture followed by drying to obtain the polyimide powder. The dehydration polymerization reaction on the diamine and the anhydride of the organic acid can be carried out directly in the non-polar solvent to obtain the polyimide which is insoluble in the non-polar solvent. Therefore, the polyimide powder with fine particle size can be obtained by directly filtering the reaction mixture without washing followed by drying. Not only complex washing and grinding processes are not needed, but also the production period is shortened, the production cost is reduced, and the large-scale production becomes more convenient. Meanwhile, the invention uses a non-polar solvent as the reaction medium, which is less toxic and may be recycled by simple distillation, thus further saving the preparation cost. In addition, a modified polyimide may be obtained by incorporating other fillers into the preparation process in the present invention, thereby to satisfy different usage requirements.

In order to further illustrate the present invention, the preparation method of polyimide of the present invention will be described in details in conjunction with the examples in the following.

EXAMPLE 1

300 mL xylene was metered into a reactor equipped with a water separator and a stirrer. Under stirring, 43.8 grams of triphenyl diether tetracarboxylic acid was poured into the reactor, and heated to 144° C. to reflux to entrain water. When there was no water separated in the water separator, it was cooled to room temperature and analyzed the anhydride formation; when the anhydride formation was above 98%, 20.00 g of 4,4'-diaminodiphenyl ether was added, stirred continuously and heated to 144° C. to entrain water. When there was no water separated in the water separator, it was cooled to room temperature and the resulting reaction mixture was filtered. The filter cake was dried under vacuum at 200° C.~240° C. for 1 hour, discharged and sieved to obtain a bisether anhydride-type polyimide powder, with a yield above 95%.

The bisether anhydride-type polyimide powder was dissolved in m-cresol, and its inherent viscosity was measured to be 1.21 dL/g.

EXAMPLE 2

300 mL xylene was metered into a reactor equipped with a water separator and a stirrer. Under stirring, 43.8 g of triphenyl diether tetracarboxylic acid was poured into the reactor, and heated to 144° C. to reflux to entrain water. When there was no water separated in the water separator, it was cooled to room temperature and analyzed the anhydride formation; when the anhydride formation was above 98%, 4.17 g of carbon fibers and 20.00 g of 4,4'-diaminodiphenyl ether were added, stirred continuously and heated to 144° C. to entrain water. When there was no water separated in the water separator, it was cooled to room temperature and the resulting reaction mixture was filtered. The filter cake was dried under vacuum at 240° C.~290° C. for 1 hour, discharged and sieved to obtain a bisether anhydride-type polyimide powder, with a yield above 95%.

EXAMPLE 3

A 300 mL mixture of xylene and chloro-o-xylene was metered into a reactor equipped with a water separator and a stirrer. Under stirring, 43.8 g of triphenyl diether tetracarboxylic acid was poured into the reactor, and heated to 150° C. to reflux to entrain water. When there was no water separated in the water separator, it was cooled to room temperature and analyzed the anhydride formation; when the anhydride formation was above 98%, 20.00 g of 4,4'-diaminodiphenyl ether was added, stirred continuously and heated to 150° C. to entrain water. When there was no water separated in the water separator, it was cooled to room temperature and the resulting reaction mixture was filtered. The filter cake was dried under vacuum at 200° C.~240° C.

for 1 hour, discharged and sieved to obtain a bisether anhydride-type polyimide powder, with a yield above 95%.

The bisether anhydride-type polyimide powder was dissolved in m-cresol, and its inherent viscosity was measured to be 0.83 dL/g.

EXAMPLE 4

300 mL xylene was metered into a reactor equipped with a water separator and a stirrer. Under stirring, 19.4 g of pyromellitic dianhydride and 20.00 g of 4,4'-diaminodiphenyl ether were poured into the reactor, and heated to 150° C. to reflux to entrain water. When there was no water separated in the water separator, it was cooled to room temperature and the resulting reaction mixture was filtered. The filter cake was dried under vacuum at 200° C.~240° C. for 1 hour, discharged and sieved to obtain a pyromellitic-type polyimide powder, with a yield above 96%.

The pyromellitic-type polyimide powder was dissolved in concentrated sulfuric acid, and its inherent viscosity was measured to be 0.43 dL/g.

EXAMPLE 5

300 mL nonane was metered into a reactor equipped with a water separator and a stirrer. Under stirring, 43.8 g of triphenyl diether tetracarboxylic acid was poured into the reactor, and heated to 126° C. to reflux to entrain water. When there was no water separated in the water separator, it was cooled to room temperature and analyzed the anhydride formation; when the anhydride formation was above 98%, 20.00 g of 4,4'-diaminodiphenyl ether was added, stirred continuously and heated to 126° C. to entrain water. When there was no water separated in the water separator, it was cooled to room temperature and the resulting reaction mixture was filtered. The filter cake was dried under vacuum at 200° C.~240° C. for 1 hour, discharged and sieved to obtain a bisether anhydride-type polyimide powder, with a yield above 95%.

The bisether anhydride-type polyimide powder was dissolved in m-cresol, and its inherent viscosity was measured to be 0.92 dL/g.

EXAMPLE 6

300 mL nonane was metered into a reactor equipped with a water separator and a stirrer. Under stirring, 29.4 g of biphthalic dianhydride and 20.00 g of 4,4'-diaminodiphenyl ether were poured into the reactor, and heated to 126° C. to reflux to entrain water. When there was no water separated in the water separator, it was cooled to room temperature and the resulting reaction mixture was filtered. The filter cake was dried under vacuum at 200° C.~240° C., discharged and sieved to obtain a biphenyl-type polyimide powder, with a yield above 95%.

The biphenyl-type polyimide powder was dissolved in p-chlorophenol, and its inherent viscosity was measured to be 1.67 dL/g.

EXAMPLE 7

300 mL chorobenzene was metered into a reactor equipped with a water separator and a stirrer. Under stirring, 31.0 g of tetracarboxydiphtalic ether dianhydride and 10.8 g of p-phenylenediamine were poured into the reactor, and heated to 131.7° C. to reflux to entrain water. When there was no water separated in the water separator, it was cooled to room temperature and the resulting reaction mixture was filtered. The filter cake was dried under vacuum at 200° C.~240° C., discharged and sieved to obtain a monoether anhydride-type polyimide powder, with a yield above 95%.

EXAMPLE 8

300 mL xylene was metered into a reactor equipped with a water separator and a stirrer. Under stirring, 32.6 g of diphenylthioether dianhydride and 20.00 g of 4,4'-diaminodiphenyl ether were poured into the reactor, and heated to 144° C. to reflux to entrain water. When there was no water separated in the water separator, it was cooled to room temperature and the resulting reaction mixture was filtered. The filter cake was dried under vacuum at 200° C.~240° C., discharged and sieved to obtain a monothioether anhydride-type polyimide powder, with a yield above 95%.

The monothioether anhydride-type polyimide powder was dissolved in p-chlorophenol, and its inherent viscosity was measured to be 0.52 dL/g.

EXAMPLE 9

300 mL xylene was metered into a reactor equipped with a water separator and a stirrer. Under stirring, 32.2 g of benzophenonetetracarboxylic dianhydride and 20.00 g of 4,4'-diaminodiphenyl ether were poured into the reactor, and heated to 144° C. to reflux to entrain water. When there was no water separated in the water separator, it was cooled to room temperature and the resulting reaction mixture was filtered. The filter cake was dried under vacuum at 200° C.~240° C., discharged and sieved to obtain a ketone anhydride-type polyimide powder, with a yield above 95%.

EXAMPLE 10

300 mL xylene was metered into a reactor equipped with a water separator and a stirrer. Under stirring, 40.2 g of resorcinol diether dianhydride and 20.00 g of 4,4'-diaminodiphenyl ether were poured into the reactor, and heated to 144° C. to reflux to entrain water. When there was no water separated in the water separator, it was cooled to room temperature and the resulting reaction mixture was filtered. The filter cake was dried under vacuum at 200° C.~240° C., discharged and sieved to obtain a bisether anhydride-type polyimide powder, with a yield above 95%.

EXAMPLE 11

300 mL xylene was metered into a reactor equipped with a water separator and a stirrer. Under stirring, 40.2 g of resorcinol diether dianhydride and 20.00 g of 4,4'-diaminodiphenyl ether were poured into the reactor, and heated to 144° C. to reflux to entrain water. When there was no water separated in the water separator, it was cooled to room temperature and the resulting reaction mixture was filtered. The filter cake was dried under vacuum at 200° C.~240° C., discharged and sieved to obtain a bisether anhydride-type polyimide powder, with a yield above 95%.

EXAMPLE 12

300 mL nonane was metered into a reactor equipped with a water separator and a stirrer. Under stirring, 23.2 g of biphthalic dianhydride, 20.00 g of 4,4'-diaminodiphenyl ether and 9.93 g of 4-phenylalkynyl anhydride were poured into the reactor, and heated to 126° C. to reflux to entrain water. When there was no water separated in the water separator, it was cooled to room temperature and the resulting reaction mixture was filtered. The filter cake was dried under vacuum at 200° C.~240° C., discharged and sieved to obtain an oligomer powder with phenylaklynyl groups, with a yield above 95%.

EXAMPLE 13

300 mL xylene was metered into a reactor equipped with a water separator and a stirrer. Under stirring, 21.48 g of benzophenonetetracarboxylic dianhydride, 19.83 g of diaminodiphenylmethane and 21.89 g of norbornene dianhydride were poured into the reactor, and heated to 144° C. to reflux to entrain water. When there was no water separated in the water separator, it was cooled to room temperature and the resulting reaction mixture was filtered. The filter cake was dried under vacuum at 150° C., discharged and sieved to obtain an oligomer powder with norbornene terminal groups, with a yield above 93%.

The above description is only the preferred embodiments of the present invention, it should be noted that, for those of ordinary skill in the art, various improvements and modifications can be made without departing from the principle of the present invention, which should be considered within the scope of the present invention.

The invention claimed is:

1. A preparation method of a polyimide, the method comprising:
    metering 300 mL of xylene into a reactor equipped with a water separator and a stirrer;
    under stirring, pouring 43.8 g of triphenyl diether tetracarboxylic acid into the reactor, and heating to 144° C. to reflux to entrain water and form triphenyl diether dianhydride;
    when the anhydride formation is above 98%, adding either 4.17 g of carbon fibers and 20.00 g of 4,4'-diaminodiphenyl ether to the reactor;
    continuously stirring and heating to 144° C. to entrain water;
    cooling to room temperature and filtering the resulting reaction mixture;
    drying the filter cake under vacuum at a temperature between 240° C. and 290° C. for 1 hour; and
    discharging and sieving the filter cake to obtain a bisether anhydride-type polyimide powder, with a yield of above 95%.

* * * * *